(12) United States Patent
Schade et al.

(10) Patent No.: US 11,279,093 B2
(45) Date of Patent: Mar. 22, 2022

(54) CONNECTION ARRANGEMENT AND METHOD FOR WELDING A FIRST PLASTIC COMPONENT TO A SECOND PLASTIC COMPONENT

(71) Applicant: Robert Bosch GmbH, Stuttgart (DE)

(72) Inventors: Till Schade, Kempten (DE); Werner Steinberger, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/978,130

(22) PCT Filed: Feb. 14, 2019

(86) PCT No.: PCT/EP2019/053609
§ 371 (c)(1),
(2) Date: Sep. 3, 2020

(87) PCT Pub. No.: WO2019/174843
PCT Pub. Date: Sep. 19, 2019

(65) Prior Publication Data
US 2021/0008811 A1   Jan. 14, 2021

(30) Foreign Application Priority Data
Mar. 15, 2018  (DE) ..................... 10 2018 203 923.2

(51) Int. Cl.
*B32B 41/00*    (2006.01)
*B29C 65/36*    (2006.01)
(Continued)

(52) U.S. Cl.
CPC ...... *B29C 65/3652* (2013.01); *B29C 65/3608* (2013.01); *B29C 65/3648* (2013.01);
(Continued)

(58) Field of Classification Search
CPC ........... B29C 65/3652; B29C 65/3608; B29C 65/3648; B29C 65/3668; B29C 65/3676;
(Continued)

(56) References Cited

FOREIGN PATENT DOCUMENTS

| DE | 10 2013 003 105 A1 | 8/2014 |
|----|---------------------|--------|
| GB | 2 194 915 A | 3/1988 |

(Continued)

OTHER PUBLICATIONS

International Search Report corresponding to PCT Application No. PCT/EP2019/053609, dated May 13, 2019 (German and English language document) (5 pages).

*Primary Examiner* — Michael N Orlando
*Assistant Examiner* — Joshel Rivera
(74) *Attorney, Agent, or Firm* — Maginot, Moore & Beck LLP (57) ABSTRACT

A connection arrangement includes a first plastic component, a second plastic component, and a closed induction ring. The first plastic component has a first joining region designed as a receptacle, and at one end, the second plastic component has a second joining region introduced into the first joining region. At the joining regions, the induction ring is at least partially fused into the two plastic components such that at one contact region between a first plastic melt of the first plastic component and a second plastic melt of the second plastic melt, a material-conclusive connection is generated. In this case, the induction ring is melted into the first plastic component while forming at least one first undercut, and is melted into the second plastic component while forming at least one second undercut such that between the plastic components and the induction ring, one each form-fitting connection is created.

9 Claims, 6 Drawing Sheets (51) Int. Cl.
*B29C 65/00* (2006.01)
*F16B 5/08* (2006.01)

(52) U.S. Cl.
CPC ...... *B29C 65/3668* (2013.01); *B29C 65/3676* (2013.01); *B29C 65/3684* (2013.01); *B29C 66/124* (2013.01); *B29C 66/126* (2013.01); *B29C 66/1222* (2013.01); *B29C 66/3034* (2013.01); *B29C 66/526* (2013.01); *B29C 66/5344* (2013.01); *B29C 66/73921* (2013.01); *F16B 5/08* (2013.01)

(58) Field of Classification Search
CPC ............ B29C 65/3684; B29C 66/1222; B29C 66/124; B29C 66/126; B29C 66/3034; B29C 66/526; B29C 66/5344; B29C 66/73921; B29C 66/30341; B29C 66/54; B29C 66/322; B29C 66/1162; B29C 65/3628; B29C 66/1224; B29C 65/362; F16B 5/08
USPC .................... 156/60, 64, 350, 351, 378, 379
See application file for complete search history.

(56) References Cited

FOREIGN PATENT DOCUMENTS

JP          S60-32632 A        2/1985
JP          2000146073 A   *   5/2000

\* cited by examiner

CONNECTION ARRANGEMENT AND METHOD FOR WELDING A FIRST PLASTIC COMPONENT TO A SECOND PLASTIC COMPONENT

This application is a 35 U.S.C. § 371 National Stage Application of PCT/EP2019/053609, filed on Feb. 14, 2019, which claims the benefit of priority to Serial No. DE 10 2018 203 923.2, filed on Mar. 15, 2018 in Germany, the disclosures of which are incorporated herein by reference in their entirety.

The disclosure starts from a connection arrangement and from a method for welding a first plastic component to a second plastic component.

BACKGROUND

In electromagnetic resistance welding (ERW) or in induction welding, eddy currents are induced in a closed annular metallic component or in an induction ring by an alternating electromagnetic field (typically 10 kHz to 40 kHz), which is generally produced by a water-cooled coil. Owing to heat losses, the induction ring is heated and, by virtue of heat conduction, leads to the melting of the plastic polymers of the two joining partners, which are then joined and consolidated under pressure.

Figure 10:
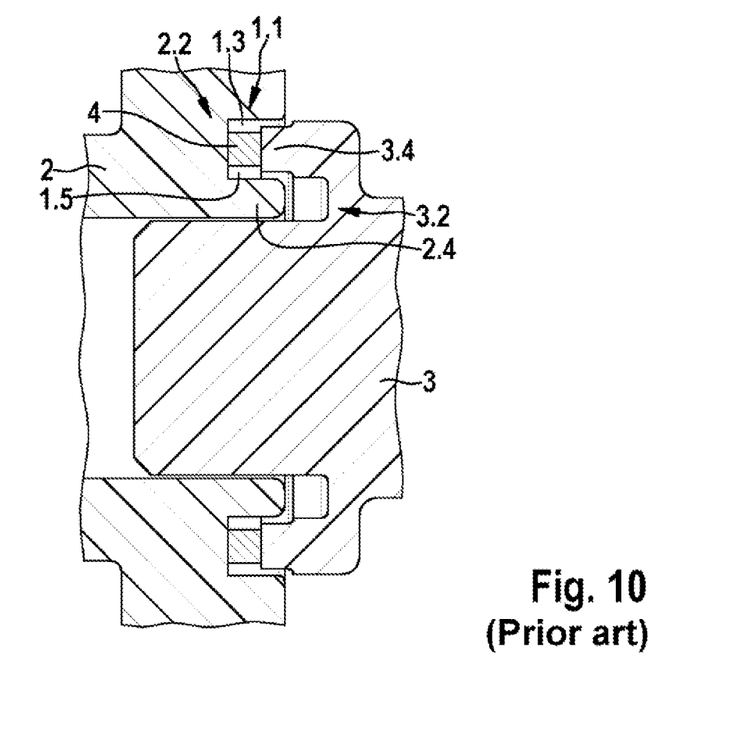
FIG. 10 shows a schematic sectional illustration of the components from FIG. 9 known from the prior art, before the welding process.
Figure 11:
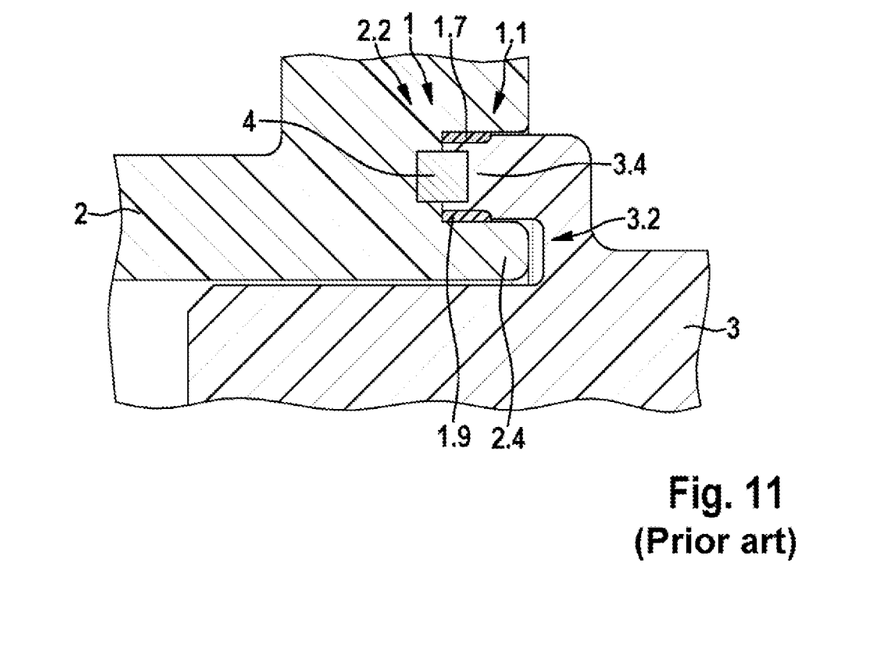
FIG. 11 shows a schematic sectional illustration of a defect-free connection arrangement produced from components from FIG. 10 known from the prior art, after the welding process.
Figure 12:
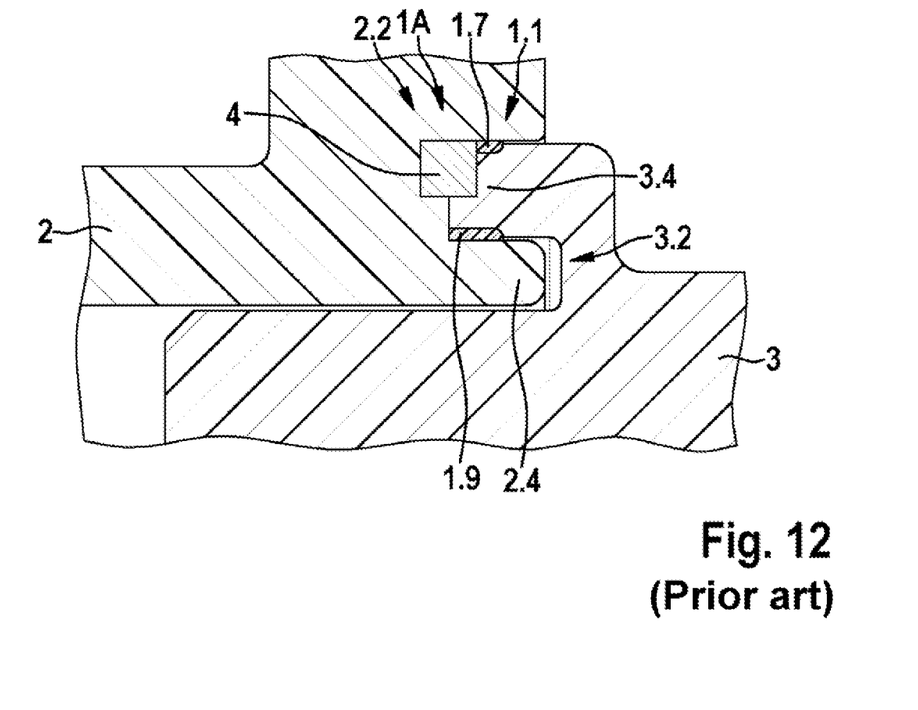
FIG. 12 shows a schematic sectional illustration of a defect-free connection arrangement produced from components from FIG. 10 known from the prior art, after the welding process.

FIGS. 9 to 12 show a connection arrangement 1, 1A known from the prior art, having a first plastic component 2, a second plastic component 3 and a closed induction ring 4, which has an angular cross section and is arranged in a joining gap 1.1 between the two plastic components 2, 3. As can be seen from FIGS. 9 and 10, the first plastic component 2 has a first joining region 2.2, which comprises a receiving opening, an encircling first collar 2.4 and a joining gap 1.1. The second plastic component 3 has a second joining region 3.2, which has an offset and an encircling second collar 3.4, wherein a depression is formed between the offset and the encircling second collar 34. As can furthermore be seen from FIG. 10, the induction ring 4 is arranged in the joining gap 1.1 between a base of the joining gap 1.1 and an end face of the second collar 3.4, which is likewise inserted into the joining gap 1.1. The first collar 2.4 is inserted into the depression between the second collar 3.4 and the offset. As can furthermore be seen from FIG. 10, the induction ring 4 and the second collar 3.4 divide the joining gap 1.1 into an upper annular gap 1.3 and a lower annular gap 1.5. FIG. 10 shows the connection arrangement 1, 1A before a welding process, in which a coil (not illustrated) produces an alternating field which heats the induction ring 4 by means of the induced eddy currents and leads to local melting of the first plastic component 2 and of the second plastic component 3 in the region of the joining gap 1.1. The two plastic components 2, 3 are then joined under pressure, and the two annular gaps 1.3, 1.5 provided are filled with plastic melt 1.7, 1.9, as can be seen from FIG. 11. FIG. 11 shows the defect-free connection arrangement 1 after the welding process. As can be seen from FIG. 12, the induction ring 1.1 in the connection arrangement 1A illustrated has an eccentric position after the welding process, and therefore the annular gaps 1.3, 1.5 filled with plastic melt 1.7, 1.9 that are formed are not uniform, in contrast to FIG. 11. The nonuniform or partially absent annular gaps 1.3, 1.5 may impair the quality of the connection arrangement 1A illustrated.

Common to the known connection arrangements is the fact that the plastic melts of the two plastic components essentially fill only the cavities, and join together to form a "joining seam" and establish a materially integral joint only in direct proximity to the induction ring.

SUMMARY

The connection arrangement and the method for welding a first plastic component to a second plastic component having the features described herein each have the advantage that, in addition to the materially integral joint, a durable positive joint is produced.

In embodiments of the disclosure, the joining geometries of the plastic components can advantageously be achieved easily in the injection molds. The induction ring can be rolled or deep drawn at low cost as a mass-produced product. Moreover, embodiments of the disclosure make available induction rings with a ring design that is made radially flexible, thereby advantageously making it possible to improve thermal shock resistance (TSR). Thus, the durability of the joint may be reduced after a thermal shock test owing to the different coefficients of expansion of metal and plastic. This can be avoided by means of a matching ring configuration, which makes the induction ring more flexible, especially in the radial direction.

Embodiments of the present disclosure make available a connection arrangement having a first plastic component, a second plastic component, and a closed induction ring. The first plastic component has a first joining region embodied as a socket, and the second plastic component has, at one end, a second joining region inserted into the first joining region. The induction ring is melted at least partially into the two plastic components in the joining regions, with the result that a materially integral joint is formed in a contact region between a first plastic melt of the first plastic component and a second plastic melt of the second plastic component. In this case, the induction ring is melted into the first plastic component, thereby forming at least one first undercut, and is melted into the second plastic component, thereby forming at least one second undercut, with the result that a respective positive joint is formed between the plastic components and the induction ring.

Moreover, a proposal is made for a method for welding a first plastic component, which has a first joining region embodied as a socket, to a second plastic component which, at one end, has a second joining region. A closed induction ring is arranged between the joining regions of the two plastic components, wherein the closed induction ring is heated by an alternating electromagnetic field, and the plastic polymers of the two plastic components melt. The melted plastic components are moved toward one another under pressure, with the result that a materially integral joint is formed in a contact region between a first plastic melt of the first plastic component and a second plastic melt of the second plastic component. During this process, the induction ring is melted into the first plastic component, thereby forming at least one first undercut, and is melted into the second plastic component, thereby forming at least one second undercut, with the result that a respective positive joint is formed between the plastic components and the induction ring.

In embodiments of the disclosure, the at least one first undercut and a first positive joint resulting therefrom between the induction ring and the first plastic component prevent the induction ring from being removed from the socket of the first plastic component. The at least one second undercut and a second positive joint resulting therefrom between the induction ring and the second plastic component prevent the second plastic component from being pulled out of the induction ring and out of the socket of the first plastic component.

By means of the measures and developments presented below, advantageous improvements of the connection arrangement and of the method for welding a first plastic component to a second plastic component are possible.

It is particularly advantageous that the first joining region of the first plastic component can be embodied as a cylindrical receiving opening, and the second joining region of the second plastic component can be embodied as a cylindrical portion, which can be inserted without the formation of a gap into the cylindrical receiving opening of the first plastic component. This means that an outside diameter of the cylindrical portion of the second plastic component corresponds substantially to the diameter of the cylindrical receiving opening. This allows particularly simple and low-cost production of the two joining regions.

In an advantageous embodiment of the connection arrangement, the first joining region of the first plastic component can be embodied as a conical receiving opening, and the second joining region of the second plastic component can be embodied as a conical portion, which can be inserted into the conical receiving opening of the second plastic component until firmly seated. This likewise allows simple and low-cost production of the two joining regions. The conical embodiment of the two joining contours advantageously brings about automatic centering of the first plastic component, the second plastic component and the induction ring relative to one another. This results in uniform undercuts, thus enabling the quality of the connection arrangement or of the weld to be improved. Moreover, this embodiment is insensitive to component tolerances.

In another advantageous embodiment of the connection arrangement, the closed induction ring can have a main body embodied as a cylindrical or conical hollow body and can be composed of a metal or a conductive plastic or a plastic filled with ferromagnetic particles. In the embodiment of the induction ring composed of a plastic filled with ferromagnetic particles, it is no longer the eddy current losses but magnetization reversal losses which are used to heat the induction ring. Moreover, the induction ring having a conical main body can melt uniformly into the two plastic components. The embodiment as a metal ring allows particularly low-cost implementation of the induction ring. In the embodiment of the induction ring from a conductive plastic or from a plastic filled with ferromagnetic particles, the coefficients of expansion of the two plastic components and of the induction ring can advantageously harmonize better. In addition, the induction ring can melt, which can further enhance the quality of the joint. Moreover, embodying the induction ring from conductive plastic also allows a further improvement in the thermal shock resistance of the welded joint and thus also in the quality of the welded joint.

In another advantageous embodiment of the connection arrangement, the main body can have at least one opening and/or at least one recess in its lateral surface. It is thereby possible to produce undercuts between the plastic components and the induction ring and to improve the positive joints. The at least one opening can have a round cross section or an angular cross section, for example, wherein the corners can be rounded. It is thereby possible to reduce the notch effect of the induction ring, thus enabling the thermal shock resistance of the welded joint to be increased. The at least one recess can be embodied as a wave-shaped recess or as a loop-shaped recess.

In another advantageous embodiment of the connection arrangement, the main body can have knurling and/or embossing in some region or regions of its lateral surface. By this means too, undercuts can be produced between the plastic components and the induction ring, and the positive joints can be improved.

To carry out the method, the induction ring can be inserted without a gap into the first joining region, embodied as a socket, of the first plastic component, for example. As an alternative, the induction ring can be placed without a gap on the second joining region of the second plastic component. Large degrees of freedom in the assembly sequence and thus also in the production line are thereby advantageously made possible.

Illustrative embodiments of the disclosure are illustrated in the drawing and are explained in greater detail in the following description. In the drawing, identical reference signs denote components or elements which perform identical or similar functions.

DETAILED DESCRIPTION

As can be seen from FIGS. 1 to 8, the illustrated illustrative embodiments of a connection arrangement 10A, 10B according to the disclosure each comprise a first plastic component 20, 20A, 20B, a second plastic component 30, 30A, 30B, and a closed induction ring 40. The first plastic component 20, 20A, 20B has a first joining region 22 embodied as a socket, and the second plastic component 30, 30A, 30B has, at one end, a second joining region 32 inserted into the first joining region 22. The induction ring 40 is melted at least partially into the two plastic components 20, 20A, 20B, 30, 30A, 30B in the joining regions 22, 32, with the result that a materially integral joint is formed in a contact region between a first plastic melt 24 of the first plastic component 20, 20A, 20B and a second plastic melt 34 of the second plastic component 30, 30A, 30B. In this case, the induction ring 40 is melted into the first plastic component 20, 20A, 20B, thereby forming at least one first undercut 14, and is melted into the second plastic component 30, 30A, 30B, thereby forming at least one second undercut 16, with the result that a respective positive joint is formed between the plastic components 20, 20A, 20B, 30, 30A, 30B and the induction ring 40.

In embodiments of the method according to the disclosure for welding a first plastic component 20, 20A, 20B, which has a first joining region 22 embodied as a socket, to a second plastic component 30, 30A, 30B which, at one end, has a second joining region 32, a closed induction ring 40 is arranged between the joining regions 22, 32 of the two plastic components 20, 20A, 20B, 30, 30A, 30B. The closed induction ring 40 is then heated by an alternating electromagnetic field and melts the plastic polymers of the two plastic components 20, 20A, 20B, 30, 30A, 30B, wherein the melted plastic components 20, 20A, 20B, 30, 30A, 30B are moved toward one another or inserted one into the other under pressure, with the result that a materially integral joint is formed in a contact region between a first plastic melt 24 of the first plastic component 20, 20A, 20B and a second plastic melt 34 of the second plastic component 30, 30A, 30B. During this process, the induction ring 40 is melted into the first plastic component 20, 20A, 20B, thereby forming at least one first undercut 14, and is melted into the second plastic component 30, 30A, 30B, thereby forming at least one second undercut 16, with the result that a respective positive joint is formed between the plastic components 20, 20A, 20B, 30, 30A, 30B and the induction ring 40.

Figure 1:
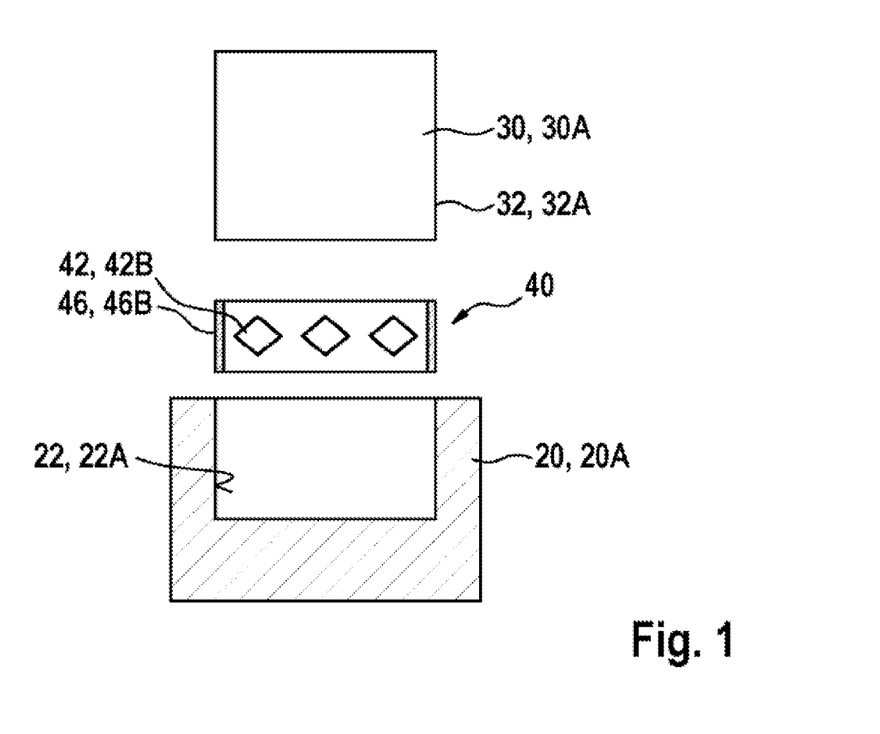
FIG. 1 shows a schematic sectional illustration of components for a first illustrative embodiment of a connection arrangement according to the disclosure.
Figure 2:
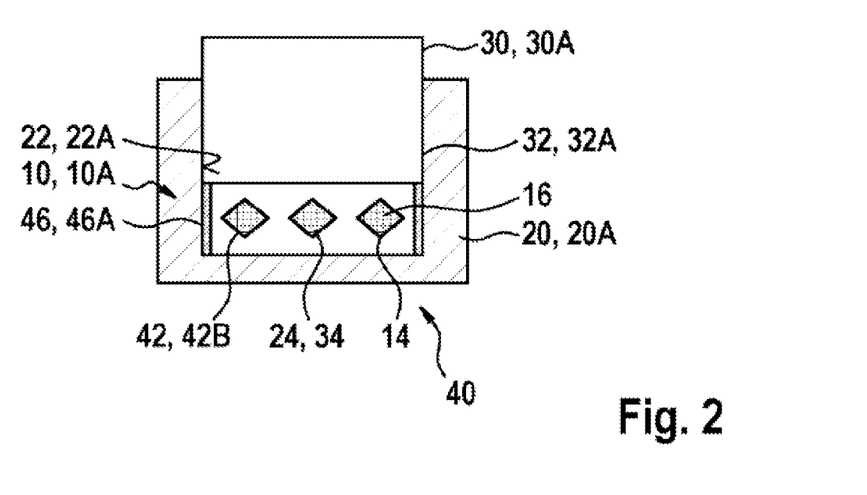
FIG. 2 shows a schematic sectional illustration of the first illustrative embodiment of a connection arrangement according to the disclosure after the welding process.
Figure 3:
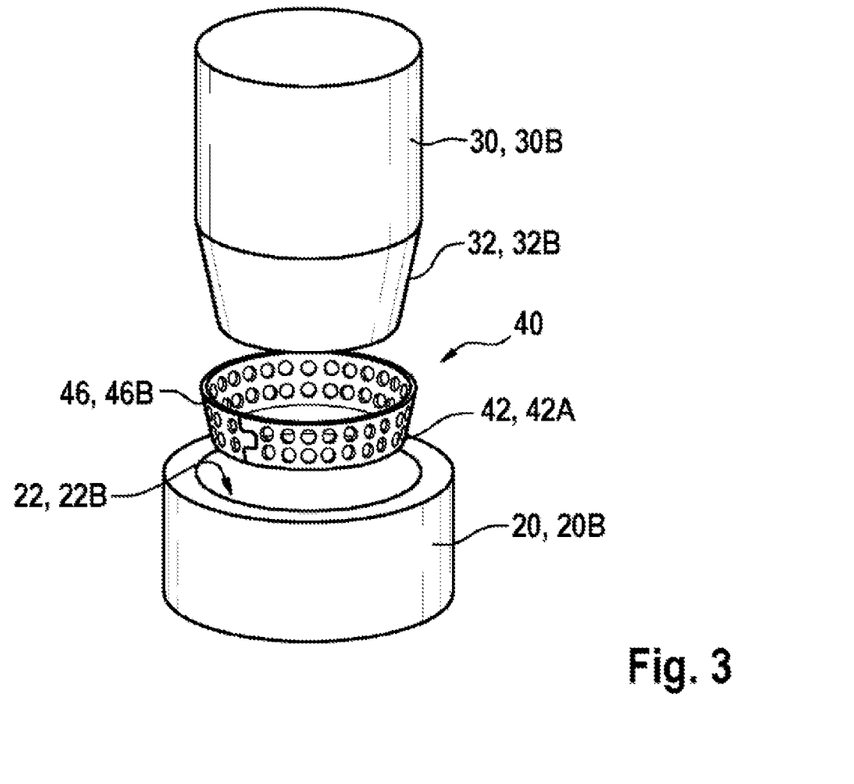
FIG. 3 shows a schematic perspective illustration of components for a second illustrative embodiment of a connection arrangement according to the disclosure.

As can furthermore be seen from FIGS. 1 and 2, the first joining region 22 of the first plastic component 20A in the illustrated illustrative embodiment is embodied as a cylindrical receiving opening 22A. The second joining region 32 of the second plastic component 30A is embodied as a cylindrical portion 32A, which can be inserted without the formation of a gap into the cylindrical receiving opening 22A of the first plastic component 20A.

As can furthermore be seen from FIGS. 3 to 6, the first joining region 22 of the first plastic component 20B in the illustrated illustrative embodiment is embodied as a conical receiving opening 22B. The second joining region 32 of the second plastic component 30B is embodied as a conical portion 32B, which can be inserted into the conical receiving opening 22B of the second plastic component 20B until firmly seated.

As can furthermore be seen from FIGS. 1 and 2, the closed induction ring 40 in the illustrated illustrative embodiment has a main body 46 embodied as a cylindrical hollow body 46A and composed of a metal. Alternatively, the main body 46 can be produced from a conductive plastic or a plastic filled with ferromagnetic particles. As can furthermore be seen from FIGS. 1 and 2, the main body 46 has a plurality of openings 42 with a diamond-shaped cross section 42B arranged in a row in its lateral surface, wherein the corners of the diamond are rounded. The number, shape and position of the openings 42 are of course a matter of arbitrary choice. However, the shape should be chosen so that the first plastic melt 24 of the first plastic component 20A can flow into the openings 42 from the outside, and the second plastic melt 34 of the second plastic component 30A can flow into the openings from the inside. This gives rise in each of the openings 42 to a first undercut 14 and a resulting first positive joint between the induction ring 40 and the first plastic component 20A, which prevents the induction ring 40 from being removed from the cylindrical receiving opening 22A of the first plastic component 20A. Moreover, there is formed in each of the openings 42 a second undercut 16 and a resulting second positive joint between the induction ring 40 and the second plastic component 30A, which prevents the second plastic component 30A from being pulled out of the induction ring 40 and out of the cylindrical receiving opening 22A of the first plastic component 20A.

As can furthermore be seen from FIGS. 3 to 6, the closed induction ring 40 in the illustrated illustrative embodiment has a main body 46 embodied as a conical hollow body 46B and composed of a metal. Alternatively, the main body 46 can be produced from a conductive plastic or a plastic filled with ferromagnetic particles. As can furthermore be seen from FIGS. 3 to 6, the main body 46 has a plurality of openings 42 of round cross section 42A arranged in two rows in its lateral surface. The number, shape and position of the openings 42 are of course a matter of arbitrary choice. The conical embodiment of the first joining region 22, of the second joining region 32 and of the induction ring 40 gives rise, at an annular end face on the larger cross-sectional area of the conical induction ring 40, to a first undercut 14, which results in a first positive joint between the conical induction ring 40 and the first plastic component 20B that prevents the induction ring 40 from being removed from the conical receiving opening 22B of the first plastic component 20B. Moreover there arises, at an annular end face on the small cross-sectional area of the conical induction ring 40, a second undercut 16, which results in a second positive joint between the induction ring 40 and the second plastic component 30B that prevents the second plastic component 30B from being pulled out of the induction ring 40 and out of the conical receiving opening 22B of the first plastic component 20B. Moreover, in a manner similar to the illustrative embodiment shown in FIGS. 1 and 2, the first plastic melt 24 of the first plastic component 20B can flow into the openings 42 from the outside, and the second plastic melt 34 of the second plastic component 30B can flow into the openings from the inside. This gives rise in each of the openings 42 to a first undercut 14 and a resulting first positive joint between the induction ring 40 and the first plastic component 20B, which prevents the induction ring 40 from being removed from the conical receiving opening 22B of the first plastic component 20B. Moreover, there is formed in each of the openings 42 a second undercut 16 and a resulting second positive joint between the induction ring 40 and the second plastic component 30B, which prevents the second plastic component 30B from being pulled out of the induction ring 40 and out of the conical receiving opening 22B of the first plastic component 20B.

Figure 4:
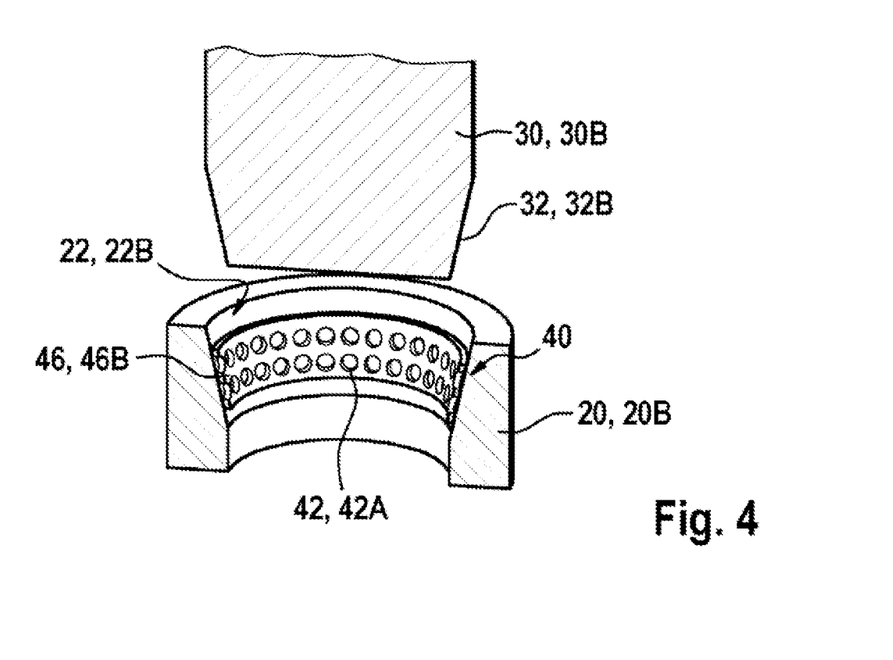
FIG. 4 shows a schematic perspective partial sectional illustration of the components from FIG. 3 with an induction ring inserted.
Figure 5:
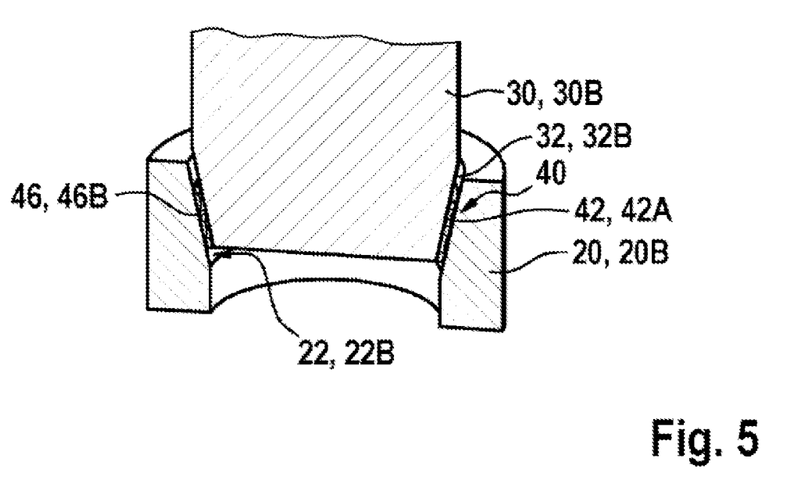
FIG. 5 shows a schematic perspective partial sectional illustration of the components from FIGS. 3 and 4 before the welding process.
Figure 6:
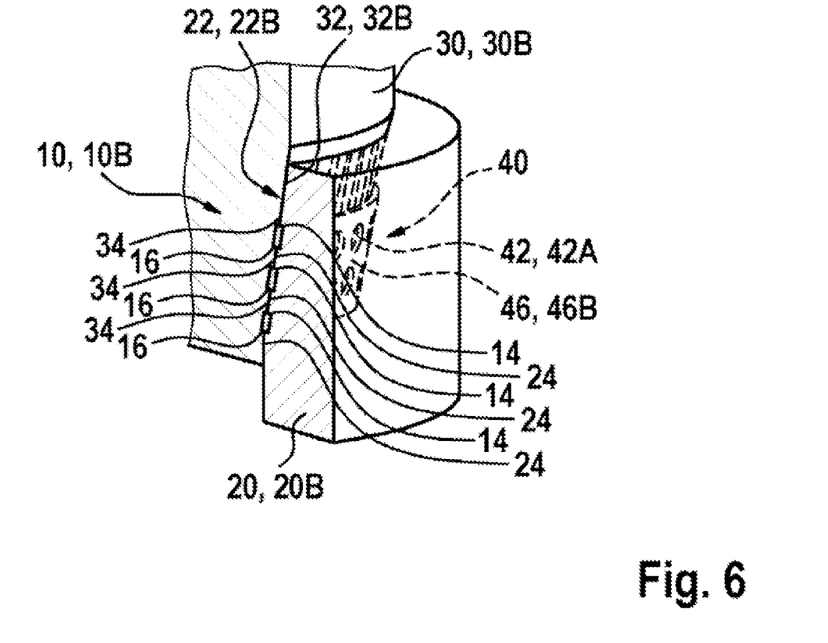
FIG. 6 shows a schematic perspective partial sectional illustration of the second illustrative embodiment of the connection arrangement according to the disclosure after the welding process.

As can furthermore be seen from FIG. 4, the induction ring 40 in the illustrated illustrative embodiment is inserted without a gap into the first joining region 22, embodied as a socket, of the first plastic component 20B. Alternatively, the induction ring 40 can be placed without a gap on the second joining region 32 of the second plastic component 30B. This applies in analogous fashion to the illustrative embodiment described with reference to FIGS. 1 and 2.

Figure 7:
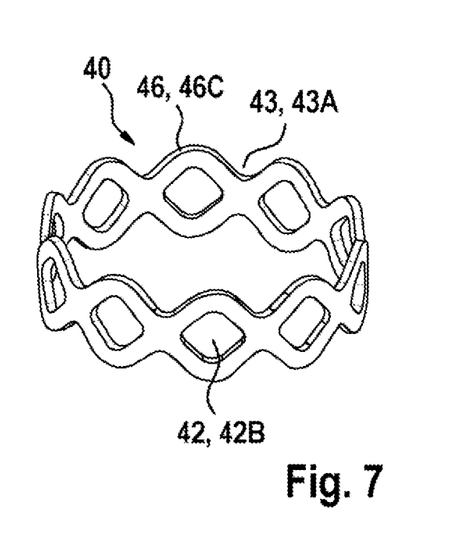
FIG. 7 shows a schematic perspective illustration of an illustrative embodiment of an induction ring for a connection arrangement according to the disclosure.

As can furthermore be seen from FIG. 7, the main body of the induction ring 40 in the illustrated illustrative embodiment is embodied as a cylindrical hollow body 46C, which has a plurality of openings 42 of diamond-shaped cross section 42B arranged in a row in its lateral surface, wherein the corners of the diamond are rounded. Moreover, the lateral surface of the cylindrical hollow body 46C has respective wave-shaped recesses 43, 43A on the upper and lower edges. Alternatively, the hollow body 46C can be of frustoconical design.

Figure 8:
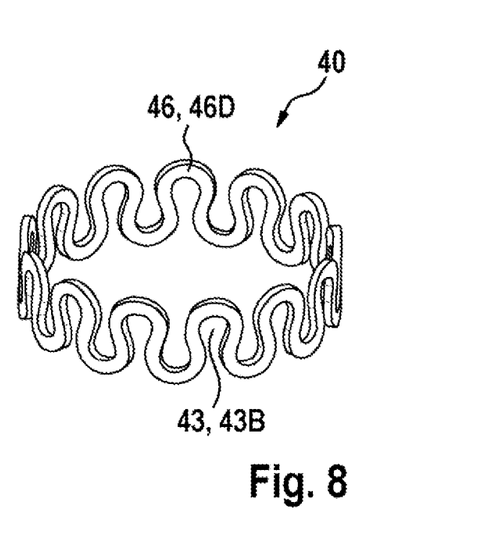
FIG. 8 shows a schematic perspective illustration of another illustrative embodiment of an induction ring for a connection arrangement according to the disclosure.
Figure 9:
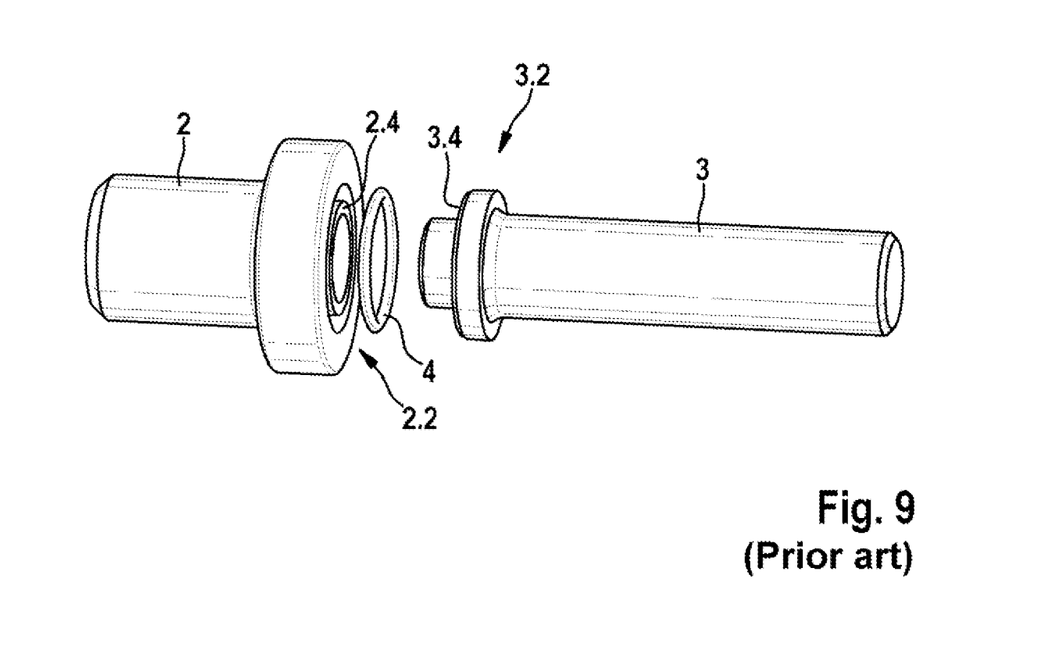
FIG. 9 shows a schematic perspective illustration of components for a connection arrangement known from the prior art.

As can furthermore be seen from FIG. 8, the main body of the induction ring 40 in the illustrated illustrative embodiment is embodied as a cylindrical hollow body 46D, which has a plurality of loop-shaped recesses 43B in its lateral surface. In the illustrated illustrative embodiment, the main body 46 of the induction ring 40 is formed by a number of loops arranged in a row, which are closed to form a ring and thus form the lateral surface of a cylinder. Alternatively, the hollow body 46D can be of frustoconical design.

In an illustrative embodiment which is not illustrated, the main body 46 of the induction ring 40 has knurling and/or embossing in some region or regions of its lateral surface. These can be provided in addition or as an alternative to the openings 42 and/or recesses 43.

The invention claimed is:

1. A connection arrangement comprising:
a first plastic component having a first joining region that includes a socket;
a second plastic component having, at one end, a second joining region inserted into the first joining region; and
a closed induction ring melted at least partially into the first and second plastic components in the first and second joining regions such that a materially integral joint is formed in a contact region between a first plastic melt of the first plastic component and a second plastic melt of the second plastic component,
wherein the closed induction ring is melted into the first plastic component so as to form at least one first undercut, and is melted into the second plastic component so as to form at least one second undercut, with the result that a respective positive joint is formed between the first and second plastic components and the closed induction ring,
wherein the closed induction ring is formed as a cylindrical or conical hollow base body, and the base body has a lateral surface defining at least one recess configured as a wave-shaped recess or a loop-shaped recess.

2. The connection arrangement as claimed in claim 1, wherein the first joining region of the first plastic component is embodied as a cylindrical receiving opening, and the second joining region of the second plastic component is embodied as a cylindrical portion inserted without the formation of a gap into the cylindrical receiving opening of the first plastic component.

3. The connection arrangement as claimed in claim 1, wherein the first joining region of the first plastic component is embodied as a conical receiving opening, and the second joining region of the second plastic component is embodied as a conical portion inserted into the conical receiving opening of the second plastic component until firmly seated.

4. The connection arrangement as claimed in claim 1, wherein the main body is formed of one of a metal, a conductive plastic, and a plastic filled with ferromagnetic particles.

5. The connection arrangement as claimed in claim 1, wherein the lateral surface further defines at least one opening.

6. The connection arrangement as claimed in claim 5, wherein the at least one opening has a round cross section or an angular cross section.

7. The connection arrangement as claimed in claim 1, wherein the lateral surface has at least one region having knurling and/or embossing.

8. A method for welding a first plastic component, which has a first joining region including a socket, to a second plastic component which, at one end, has a second joining region, the method comprising:
heating a closed induction ring, which is arranged between the first and second joining regions with an alternating electromagnetic field such that the closed induction ring melts plastic polymers of the first and second plastic components, the closed induction ring being formed as a cylindrical or conical hollow base body, and the base body having a lateral surface defining at least one recess configured as a wave-shaped recess or a loop-shaped recess;
moving the plastic components toward one another under pressure so as to form a materially integral joint in a contact region between a first plastic melt of the first plastic component and a second plastic melt of the second plastic component;
melting the closed induction ring into the first plastic component so as to form at least one first undercut; and
melting the closed induction ring into the second plastic component so as to form at least one second undercut, with the result that a respective positive joint is formed between the first and second plastic components and the closed induction ring.

9. The method as claimed in claim 8, further comprising:
inserting the closed induction ring without a gap into the first joining region, which is configured as a socket, of the first plastic component; or
placing the closed induction ring without a gap on the second joining region of the second plastic component.

* * * * *